United States Patent [19]

Foret

[11] Patent Number: 4,468,986
[45] Date of Patent: Sep. 4, 1984

[54] ADJUSTABLE INTERMITTENT INCREMENTAL ADVANCE SYSTEM

[75] Inventor: Pierre G. Foret, Falmouth, Mass.

[73] Assignee: Foret Systems, Inc., Falmouth, Mass.

[21] Appl. No.: 250,429

[22] Filed: Apr. 2, 1981

[51] Int. Cl.³ ............................................. B23Q 17/00
[52] U.S. Cl. ........................................ 74/822; 74/815; 74/818
[58] Field of Search ............. 74/822, 823, 824, 813 C, 74/817, 813 R, 42, 815, 113, 116, 125.5, 818

[56] References Cited

U.S. PATENT DOCUMENTS

| | | | |
|---|---|---|---|
| 2,356,097 | 8/1944 | Stanley | 74/822 |
| 2,876,660 | 3/1959 | Malick | 74/822 |
| 2,916,950 | 12/1959 | Bullard | 74/822 |
| 2,945,169 | 2/1960 | Carr | 74/116 |
| 2,975,657 | 3/1961 | Samuel | 74/824 |
| 2,981,118 | 4/1961 | Morrill | 74/116 |
| 3,103,825 | 9/1963 | Bryant | 74/116 |
| 3,877,322 | 4/1975 | Benjamin et al. | 74/823 |
| 4,096,767 | 6/1978 | Peters, Jr. | 74/822 |
| 4,378,707 | 4/1983 | Jeffries | 74/117 |

FOREIGN PATENT DOCUMENTS 2024058  1/1980  United Kingdom .............. 74/813 C Primary Examiner—Kenneth Dorner
Assistant Examiner—Anthony W. Raskob, Jr.
Attorney, Agent, or Firm—Wolf, Greenfield & Sacks

[57] ABSTRACT

An adjustable intermittent incremental advance system is provided having a rotatable shaft for driving a work take-off in a start-stop rotary incremental advance. A clutch disk and brake disk alternately permit or stop rotary motion of the shaft to provide the intermittent advance. A flywheel is attached to the rotary shaft and acts through a crank arm driven by a motor to provide rotary power to the shaft for predetermined incremental movement. First and second sensors provide timed application of the clutch and brake disks to provide accurate incremental advance and prevent accumulated error in length of advance during prescribed periods of operation of the system.

10 Claims, 3 Drawing Figures

ADJUSTABLE INTERMITTENT INCREMENTAL ADVANCE SYSTEM

BACKGROUND OF THE INVENTION

A number of devices have been known in the machine art for providing intermittent incremental advance by means of a rotating shaft. The output shaft of such devices can mount a working rotating table for direct translation of motion, or other device such as gears for translating the intermittent incremental or indexing rotary shaft motion into a conveyor belt drive or other linear incremental indexing drive. One such device is the well-known Geneva wheel which has harmonic motion and which is usually designed to provide only one angle of incremental advance about its driving shaft axis. The angle is normally non-adjustable. Wear causes problems and tends to cause variation in the incremental advance. Another problem is serious machine damages during jams since this type of mechanism cannot slip in overload condition.

Geneva wheel arrangements are set for a single angular increment of advance. Thus if there are three different increments needed for a particular operation in a factory, three different machines are needed. If one wants to have back ups for each of the machines, three back up spare machines are needed. This severely cuts down versatility and can cause additional expense in certain factory operations. Other devices such as cam mechanisms also provide harmonic motion with the same type of problems as the Geneva drive.

Electro-vacuum and electro-magnetic friction clutch brake systems have been used in the past with a sliding disk operating on a rotating axle to cause stopping and starting of harmonic motion systems. Such systems in the past give slight cumulative variations in incremental advance which causes changes in indexing positions which are substantial over prolonged time periods.

SUMMARY OF THE INVENTION

It is an object of this invention to provide a rotary shaft driven intermittent incremental advance system which is capable of reproducing a particular angle advance without cumulative error and preferably is adjustable so as to provide for any desired angle of incremental advance.

Still another object of this invention is to provide a system in accordance with the preceding object which can provide torques as desired over a wide range so as to provide enough power for any desired application of the system.

Still another object of this invention is to provide systems in accordance with the preceding objects which provide for precise positioning of each incremental advance and for operation without accumulated error or substantially no error of any kind.

Still another object of this invention is to provide systems in accordance with the preceding objects which avoid stopping and sliding error by use of changeover from stop to start at a substantially static phase of harmonic driving motion.

Still another object of this invention is to provide systems in accordance with the preceding objects which are efficient, accurate over long periods of use and simple to operate by inexperienced personnel at reasonable cost.

Still another object of this invention is to provide methods of obtaining rotary motion in a harmonic intermittent incremental advance system which provides for versatility, accuracy and long-term operation without substantial cumulative error.

Still another object of this invention is to provide a fail-safe mechanism in jam up situations by providing predetermined slip torque.

According to the invention an intermittent incremental advance system has a driven rotatable shaft for mounting and driving a work take-off which can be advanced in start-stop rotary harmonic increments. A clutch disk and brake disk are operatively engaged with the driven shaft. A first stepper disk means operatively engages the rotatable shaft for movement therewith and has a plurality of circularly arranged first indexing indicators preferably in the form of sensing slots. A first flywheel means carries a portion of an eccentric, pivotally mounted crank arm. The other end of the crank arm is eccentrically pivotally mounted on a driving shaft preferably through a second flywheel. The drive shaft carries a second stepper disk means operatively engaged therewith for movement therewith and has a second indexing means generally using a single circularly arranged sensing slot. A drive provides continuous motion to the drive shaft translated to incremental movement in the form of angular oscillating motion, of the first flywheel means with start, stop movement of the rotatable shaft being actuated by the brake disk and clutch disk respectively. First and second sensors are engaged with the first and second indexing means to actuate alternately the brake and clutch and to provide for the stop, start movement of the driven shaft in accurate increments and without accumulated incremental distance error from one incremental movement to another.

Two timers are provided. The bypass timer 102 blocks sensing of all index indicator increments of stepper disk 60 except the last increment represented by the last slot. Timer 101 permits single cycle clutch engagement with a single external start pulse command provided by sensing a single slot on a stepper disk 90 operatively engaged with it. Bypass timer 102 can be replaced by a counter sensing predetermined rotational counts.

Preferably the second sensor 103 is activated only at regular or random selected preset time intervals sequentially through timer 101 and is a means for giving a shaft start, clutch command to enable the rotating driven shaft to go through a harmonic incremental angle of movement until the first sensor last slot is detected following blocking of unwanted sensing slots by bypass timer 102. This turns the brake on only after a preset time interval passes and the first stepper disk rotates into position to activate the first sensor brake command. This provides for avoidance of any accumulated error due to wear in the machine.

Preferably the first sensor has means for sensing the completion of the first indexing means by counting a predetermined number of indexing means or timing an interval while a clutch disk is engaged and then actuating the first sensor to actuate the brake disk and deactuate the clutch disk upon sensing the first indexing means after the time period.

According to the method of this invention, a work take-off roll is intermittently advanced in predetermined increments about 360 degrees by the use of an adjustable increment, intermittent advancing rotatable shaft. The shaft is linked with a clutch drive disk and a clutch brake disk and a flywheel. The flywheel is then linked to a crank arm and in turn linked to a driving shaft. The method comprises sensing a predetermined starting point on the driving shaft synchronized with the start feed position of the crank arm, at a predetermined time period to provide for incremental movement of the rotatable shaft over predetermined increments at exact spaced angular movements and time periods. The rotation of the driving shaft is sensed through a first sensor which senses a predetermined time after commencement of movement of the rotatable shaft or predetermined movement directly of the shaft, to actuate a brake for the shaft.

The features of this invention include the absence of any accumulated error while allowing for variation and adjustment in angle of advance in a rotatable shaft system. Precise positioning can be obtained. Sliding error in starting and stopping can be avoided. Power can be as desired for any particular application. Applications include plastic bag making, food filling and bagging operations, paper web making and cutting and the like. The systems are preferably harmonic motion devices with sine wave motion and clutching and braking at the static portion of the wave. The incremental advance is preferably adjustable from 0 degrees to 120 degrees but can be up to 360 degrees.

BRIEF DESCRIPTION OF THE DRAWINGS

The above and other features, objects and advantages of the present invention will be better understood from a reading of the following specification in conjunction with the attached drawings in which.

DESCRIPTION OF PREFERRED EMBODIMENTS

Figure 1:
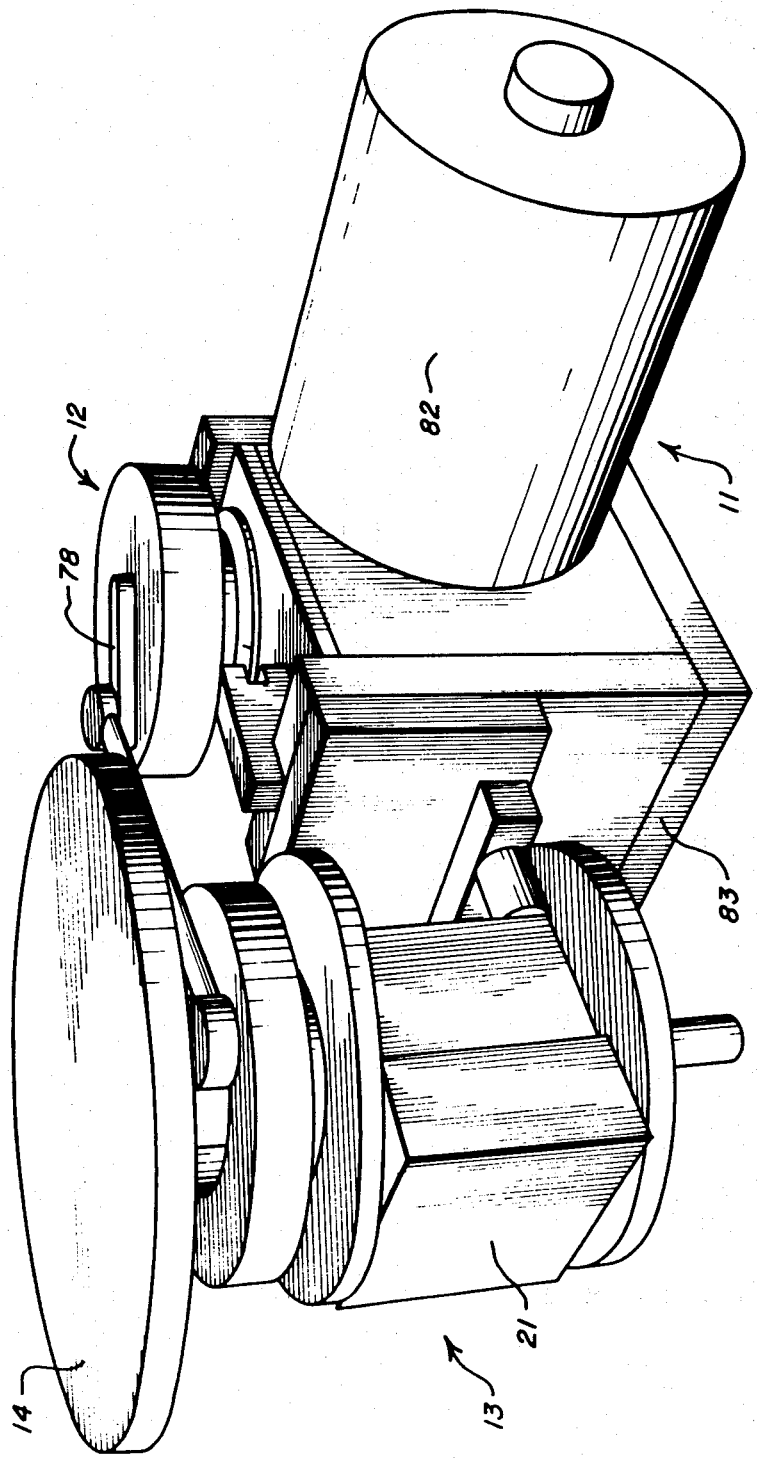
FIG. 1 is a perspective view of a preferred embodiment of the present invention.
Figure 2:
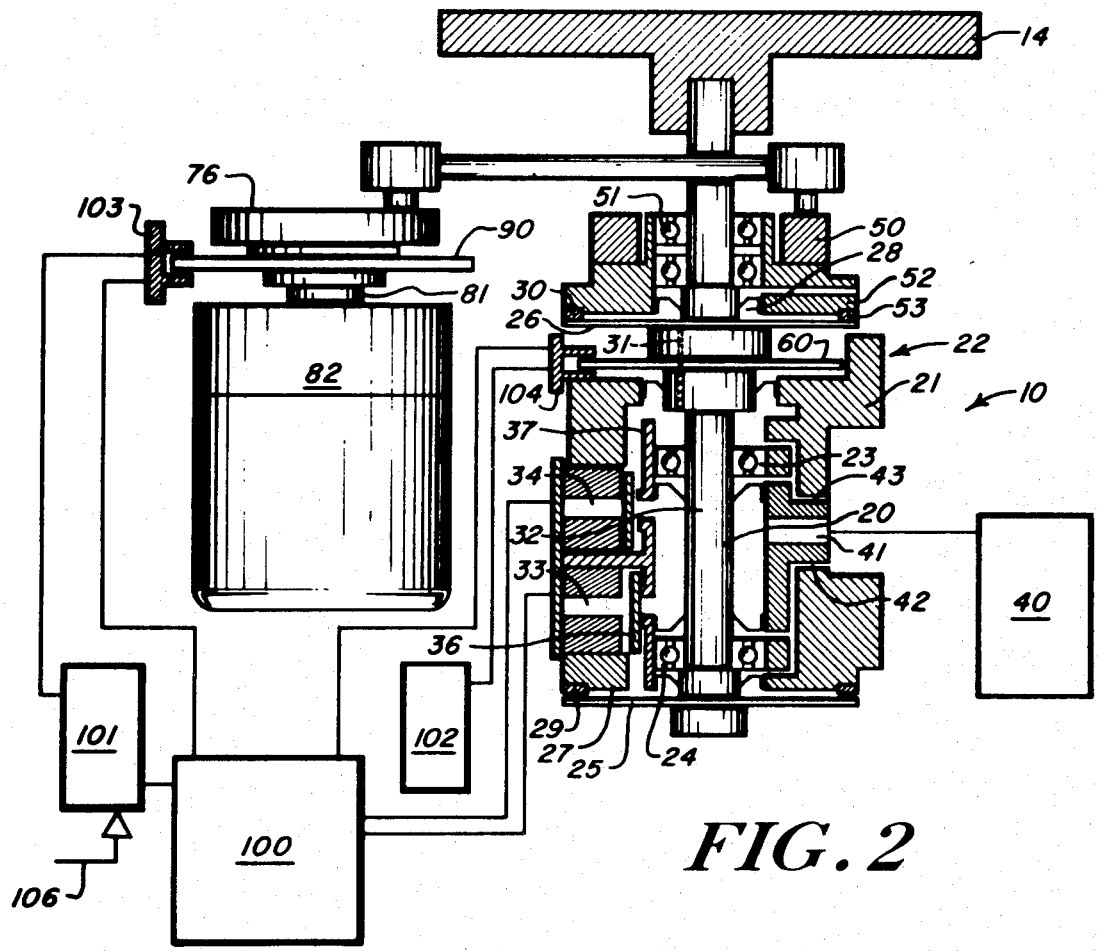
FIG. 2 is a side semi-cross-sectional, semidiagrammatic view of the preferred embodiment of this invention.

The rotating shaft driven, intermittent incremental advance system of the preferred embodiment of this invention is illustrated generally at 10 in FIG. 2. The system has a drive section 11 shown in FIG. 1, attached through a crank arm section 12, to a clutch brake system 13, which in turn actuates a work take-off 14. A control section is provided and has a power supply indicated generally at 100 in FIG. 2.

The system 10 provides an intermittent incremental rotary advance system and is driven by a motor shaft. It prevents accumulated error over periods of operation and avoids start and stopping sliding error as might otherwise occur in clutch brake systems. It provides for preselected angular advance and determination of the increments which can be changeable with ease. Precision in each start-stop motion can be obtained. The power output can be predetermined as desired for any particular application.

The work take-off of the preferred embodiment is a rotary table 14 which is preferably located in a horizontal plane and can be arranged to advance at any desired angular increment. For example, with the particular crank arm shown, it is preferred that the incremental advancement be somewhere between zero and 120 degrees for each increment of advance. The table can be used as a part of a bottle molding operation, filling operation, canning operation or for other known industrial use. In some cases the table can be a geared wheel with a chain being driven to transfer the rotary motion to a linear motion as in a power conveyor.

The rotary table is fixed to a central rotatable shaft 20 of a stationary mounted casing 21 of an electro-vacuum operated clutch brake 22.

The electro-vacuum operated clutch brake 22 can be of sutstantially standard construction as of the type described and identified in U.S. Pat. No. 3,378,121 issued Apr. 16, 1968. For example, a vacuum operated clutch brake as available from Foret Systems, Inc. of Falmouth, Mass. as clutch brake number SCB08—having 31 ft. lb. static torque can be used. FIGS. 1 and 2 of U.S. Pat. No. 3,378,121 are incorporated herein by reference along with the description of those Figures in the patent.

As is known, the clutch brake 22 has its stationary housing 21 with the centrally mounted rotatable shaft 20. The shaft 20 rotates on bearing sets 23 and 24 and has fixedly attached thereto a thin flexible brake disk 25 and a clutch disk 26. The brake and clutch disks 25 and 26 are operatively associated with vacuum areas 27 and 28 respectively which have outer friction ring seals 29 and 30 as known in the art. The vacuum areas 27 and 28 are operatively connected through suitable passageways such as 31 and 32 to electromagnetically actuated valves 33 and 34 which have associated therewith the actuating disks 36 and 37 respectively.

When the electromagnet of valve 33 is actuated, the disk 33 is lifted from its position permitting a vacuum to be exerted within the chamber 27 and when the electromagnet is deacuated, the disk causes substantially instantaneous vacuum release. Similarly disk 37 operates in the same manner. A vacuum pump 40 is interconnected with conduiting and sealed passageways 41 within the clutch brake body to provide the necessary vacuum on demand. Air inlets 42 and 43 permit instant release of the vacuum when desired. Suitable vacuum seals are provided throughout the valve.

A flywheel section comprises flywheel 50 mounted on bearings 51 and fixedly attached to rotatable plates 52 and 53. The flywheel section is engaged with the clutch disk 26 through the friction ring 30, when a vacuum is provided in chamber 28, and thus the flywheel 50 acts to drive the rotatable shaft 20. When the clutch disk is engaged with its friction ring to act as a drive, the brake disk 25 is disengaged with friction ring 29. When it is desired to stop the rotation of the shaft, the electromagnetically operated valves shift the positions of the disks 36 and 37 to apply a vacuum in chamber 27 and apply the brake stopping the shaft while simultaneously releasing the clutch disk 26. This reversible operation is as known in the art and can be carried out with the vacuum pump operating continuously and the valves being actuated by electrical signal at preselected intervals which in the present case correspond to sensing operations as will be described.

In a modification of the clutch brake, a stepper disk 60 is provided. The stepper disk 60 is fixed to the shaft 20 and rotates therewith. It carries a series of indexing indicators arranged preferably about its periphery in the form of radially extending slots 61. The slots 61 provide for indexing in this first stepper disk. The slots 61 can be counted by a suitable sensor or counting device. The number of slots used can determine the sensitivity of the device. Thus when 360 slots are used spaced 360 degrees about the circumference of the disk, one can sense each degree of rotary motion change. When fewer slots are used, sensing can be accomplished through the slots or indexing indicators to lesser variations in angular movement.

In the preferred embodiment the vacuum pump 40 can be a quarter horsepower GAST number 0522 vacuum pump which provides sufficient vacuum operation for clutching and braking of the device as for example where the rotary table is a 14-inch steel disk for carrying items to be filled and the flywheel 50 is a 7-inch diameter steel flywheel freely rotatable on the rotatable shaft 20.

Figure 3:
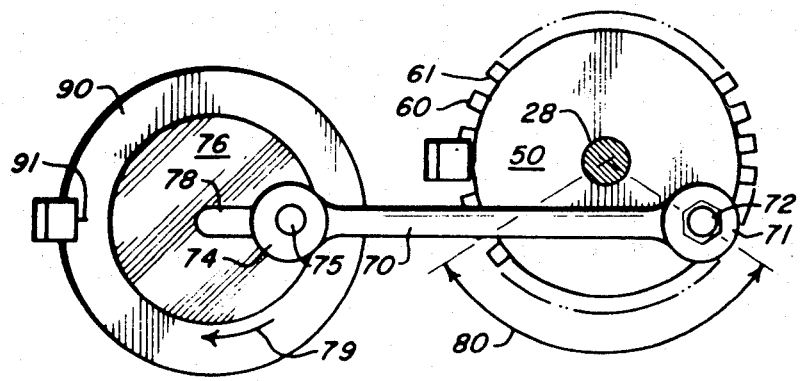
FIG. 3 is a semidiagrammatic plan view of a crank arm section thereof.

Note that the indexing indicators 61 are shown in FIG. 3 for purposes of clarity. Thus the stepper disk is shown through the materials that would normally obscure it in the view of FIG. 3.

Turning now to the crank arm section as best shown in FIGS. 2 and 3, a crank arm 70 is provided which has a portion or end 71 eccentrically, pivotally mounted through pin 72 to the flywheel 50. Another portion or end of the crank arm 70 is shown at 74 mounted through a pivotal connection to pin 75 of a flywheel 76. The crank arm end 74 can be adjusted along the radially extending slot 78 to fix the position of the crank arm with respect to the flywheel 76. The flywheel 76 rotates in the direction of arrow 79 while the flywheel 50 reciprocates in the direction shown by the double pointed arrow 80 with the extent of reciprocation being adjustable by adjustment along the slot 78 of the crank arm end portion 74.

Thus, rotation of a shaft 81 of a driving motor 82, which may be connected to the flywheel 76 through a gear box 83 to change direction of motion if desired, drives the flywheel 76 about the rotation shown by arrow 79. As the end 74 rotates, the flywheel 50 goes through its reciprocal movement. When the clutch plate 26 is engaged, the shaft 20 moves with the flywheel 50. When the clutch plate is disengaged and the brake plate engaged the shaft 20 stops. Thus the table 14 can advance continuously about a 360 degree circle with intermittent stops. Since the crank arm is used, if the shifting of the clutch and brake disks are coordinated, sliding of the friction rings 29 and 30 with respect to the clutch disk and brake disk can be avoided, since the shifting can occur when the crank arm changes the direction of motion of the flywheel 50. Thus there is substantially no sliding force applied to the friction rings and this can make shifting the motion of the rotary table more precise and less subject to sliding error.

The drive section which comprises the flywheel 76, rotatable shaft 81 and the drive motor 82 can vary greatly. In the preferred embodiment, the motor is a 1750 RPM, one horsepower, 208 VAC three-phase motor with a 10/1 gear reducer box 83.

An important part of the invention comprises a second stepper disk means 90 which is a circular disk having a single slot 91 which acts as a second indexing indicator. The stepper disk 90 is keyed to turn with the shaft 81. The stepper disk 90 with its indicating indexer means provides an indicator of the angular movement of the shaft 81. This disk could be located at other points on the shaft or at other mechanisms attached to the shaft which turn with it, so as to indicate direction of the shaft and/or number of turns thereof. Similarly, the first stepper disk 60 need not be connected directly to the shaft 20 and have an integral hub with the clutch plate 26. In some cases, that stepper disk 30 and its indexing indicators can be provided at other locations on the rotatable shaft 20. For example, it can be provided at either end of the clutch brake. Similarly the indicators can be provided on the shaft itself and sensed directly on the shaft. All of these embodiments are to be considered as the full equivalent of the positions shown in the preferred embodiment.

The control section of the system 10 comprises a controller power supply 100 which can be obtained from Foret Systems, Inc. as Foret Power Supply Number D-1560. This power supply is linked to a timer 101 and a timer 102 which are in turn respectively linked to a sensor 103 and a sensor 104. The second sensor 103 is operatively interengaged with the second stepper disk 90 while the first sensor 104 is interengaged operatively with the first stepper disk 60. Electrical wiring as indicated in the drawing interconnects the electrical timers, power supply, first and second sensors and the electromagnetic vacuum valves 33 and 34. A power line 106 is actuated by an on-off switch.

The first sensor 104 of the preferred embodiment is a photocell such as General Electric Photocell H21B1 which is activated by a slot passing therethrough when the cell is turned on, to sense the slot, by the timer 102. The second sensor 103 is also a photocell as described, which is on when so directed by timer 101, and which actuates the power controller 100 when it senses the indexing indicator 91, to sense a full revolution or predetermined number of revolutions of the flywheel 76.

In operation of the device, a signal through line 106 turns the machine on or off. Turning the signal on energizes the timer 101 for a fixed duration that is predetermined and is slightly less than the time required for a full turn of the flywheel 76. When the timer 101 is energized the light source of photocell 103 is also energized while the motor 82 is caused to run constantly. Thus flywheel 76 is constantly turning. As the indicator slot 91 passes through the photocell of second sensor 103 it gives a command to activate the power supply 100 which in turn energizes the clutch solenoid of the valve 34 and to deenergize the brake solenoid valve 33. The clutch disk is energized to couple with the oscillating flywheel 50. This causes acceleration of the shaft 20 along with the rotary worktable 14 in a sine wave harmonic motion. When starting the rotation of the shaft 20, the clutch disk solenoid is energized and the brake disk solenoid is deenergized to cause a vacuum in chamber 28 and loss of vacuum in chamber 27.

As the stepper disk 60 turns the timer 102 which has been preset for a predetermined time after activation of the clutch disk, activates the light of the photocell 104 and when the next slot 61 passes therethrough, it activates the power supply to apply the brake and cut off the clutch action thus stopping the rotating shaft 20 for its first increment for a predetermined time. That time is controlled by the on-off switch 106. An on signal from 106 starts the cycle again. In some cases, a counter can be used counting the slots 61 to cause shift from the clutch to the brake thus eliminating the timer 102. Thus the timer 102 effectively deenergizes the photocell so that it won't activate until the last predetermined slot. When the timer goes off the next slot comes into the photocell allowing actuation of the power supply to turn off the clutch and turn on the brake so that the timer is actually a timer for activating and deactivating the photocell.

When the brake is applied, this preferably occurs at the midpoint of the sine wave motion created by the crank arm just as the crank arm is shifting the movement of the flywheel 50 from one direction to the other thus avoiding sliding inertia forces on the friction disks and tending to provide long life to the clutch brake without severe frictional wear. In addition since coupling is through a friction ring, if overloading occurs, the mechanism will slip, acting as a fail-safe with no permanent damage to the apparatus.

If 106 is continuously on, then the timer 102 actuates the clutch to uncouple and apply the brake, a signal is given to the second sensor 103. When the slot 91 next passes the sensor 103, or for whatever time period determined by the timer 101 followed by the sensing slot 91, the clutch is again actuated by sensing of the slot 91 with the cycle repeated to again index the machine through another angular rotary motion of the worktable or work take-off. Because the second sensor 103 is activated by the predetermined position of the slot 91, each time it turns on the clutch, the increment of advance will be the same as the prior time and thus no cumulative incremental error occurs during operation of the apparatus. This is an important feature of the invention. Thus sensor 103 is always synchronized with the status or 0 position of crank arm.

It should be understood that the on-off switch through line 106 enables the timer 101 to determine the time period of operation of the machine. If the machine is to operate continuously, the timer 101 can be eliminated and the second sensor plugged into a power supply.

The incremental adjustment can be varied by changing the number of slots in the stepper disk 60 so that slots are sensed by the sensor 104 at whatever desired interval one desires. Similarly more than one slot 91 can be used although it is preferred that a single slot be used and this slot starts the clutching operation as it is sensed by the photocell 103.

Due to the use of the photocell arrangement and particularly the photocell 103, the system does not have a cumulative error in angular degree of incremental movement and can repeat incremental advances very precisely. Ease of adjustment of the increment of advance is possible by a simple adjustment of the position in slot 78. Power can be varied by the power put in by the drive motor 82 and the size of the various gears, wheels and the like. Accuracy is also enhanced by stopping at the dead spot in the crank arm movement so that the shaft 20 shifts to brake from clutch and vice versa at the dead spot.

While specific embodiments of the invention have been shown and described, many variations are possible. For example, the interlocking of the crank arm with the flywheel 76 and flywheel 50 can be by various nut and pin arrangements as known in the art. The particular motors, controllers and timers can vary greatly. Similarly although the clutch brake of the present invention is a vacuum operated clutch brake, in some cases air pressure actuated devices can be used.

Preferably in all cases, a sensor determines an incremental advance of a rotatable shaft coupled to a driving shaft by a clutch brake and a second sensor is adjusted and arranged with operative relationship to a physical indicator to sense position of driving shaft and thus prevent cumulative error.

What is claimed is:

1. A rotating shaft driven, intermittent incremental advance system comprising
   a rotatable shaft for driving a work take-off in stop-start rotary increments,
   a clutch disk operatively engaged with said shaft,
   a brake disk operatively engaged with said shaft,
   a first stepper disk means operatively engaged with said shaft for movement therewith and comprising a plurality of circularly arranged indicator first indexing means,
   a rotary work take-off device fixed to said shaft,
   a flywheel means carrying a portion of an eccentric, pivotally mounted crank arm,
   a second drive portion of said crank arm being eccentrically pivotally mounted on a drive shaft,
   said drive shaft carrying a second stepper disk means operatively engaged therewith for movement therewith and having a second indexing means mounted for rotating movement therewith,
   a drive means for providing constant rotation to said drive shaft translated to incremental movement of said flywheel means with stop, start movement of said rotatable shaft being actuated by said brake disk and clutch disk respectively,
   and first and second sensor means engaged with said first and second indexing means to provide for said stop, start movement in accurate increments and without accumulated incremental distance error from one incremental movement to another.

2. A rotating shaft driven, intermittent incremental advance system in accordance with claim 1 wherein said second sensor is activated only at preset time intervals and is a means for giving a rotating shaft start, clutch command to enable the rotating shaft to go through a predetermined incremental angle of movement when said second sensor is activated by said second indexing means and turns the clutch on again only after said preset time interval passes and said second indexing means rotates into position to activate said second sensor.

3. A rotating shaft driven, intermittent incremental advance system in accordance with claim 2 and further comprising said first sensor having means for sensing said first indexing means to provide an exact predetermined rotatable incremental movement of the rotating shaft when said clutch is activated by counting a predetermined number of indexing means or timing an interval while said clutch disk is engaged then actuating said first sensor to actuate said brake disk and deactuate said clutch disk upon sensing said first indexing means after said time periods.

4. A rotating shaft driven, intermittent incremental advance system in accordance with claim 3 wherein said clutch is activated by counting a predetermined number of indexing means.

5. A rotating shaft driven, intermittent incremental advance system in accordance with claim 3 wherein said brake is activated by timing an interval during which said clutch disk is engaged.

6. A rotating shaft driven, intermittent incremental advance system in accordance with claim 1 wherein said clutch disk and said brake disk are vacuum actuated to engage and/or disengage.

7. A rotating shaft driven, intermittent incremental advance system in accordance with claim 1 and further comprising a vacuum pump interconnected with a housing for said clutch disk and brake disk,
   a friction ring operatively engaged with a periphery of said clutch disk and a second friction ring operatively engaged with a periphery of said brake disk, said crank arm being adjustable as desired to vary the increment of movement and thus change angular movement of the work take-off.

8. A rotating shaft driven, intermittent incremental advance system in accordance with claim 2 and further comprising a vacuum pump interconnected with a housing for said clutch disk and brake disk,
   a friction ring operatively engaged with a periphery of said clutch disk and a second friction ring operatively engaged with a periphery of said brake disk,
   said crank arm being adjustable as desired to vary the increment of movement and thus change angular movement of the work take-off.

9. A rotating shaft driven, intermittent incremental advance system in accordance with claim 3 and further comprising a vacuum pump interconnected with a housing for said clutch disk and brake disk,
   a friction ring operatively engaged with a periphery of said clutch disk and a second friction ring operatively engaged with a periphery of said brake disk,
   said crank arm being adjustable as desired to vary the increment of movement and thus change angular movement of the work take-off.

10. A rotating shaft driven, intermittent incremental advance system in accordance with claim 1 and further comprising control means for providing engagement of said clutch disk with disengagement of said brake disk in a first mode and engagement of said brake disk with disengagement of said clutch disk in a second mode with each shift and mode arranged to take place at a stop position of movement caused by said crank arm.

* * * * *